US009235394B2

(12) United States Patent  
Inglis et al.

(10) Patent No.: US 9,235,394 B2  
(45) Date of Patent: Jan. 12, 2016

(54) METHOD AND SYSTEM FOR CODE GENERATION AND INLINING

(75) Inventors: Derek B Inglis, Ontario (CA); Kiyokuni Kawachiya, Kanagawa-ken (JP); Tamiya Onodera, Tokyo (JP); Michiaki Tatsubori, Kanagawa (JP)

(73) Assignee: International Business Machines Corporation, Armonk, NY (US)

( * ) Notice: Subject to any disclaimer, the term of this patent is extended or adjusted under 35 U.S.C. 154(b) by 982 days.

(21) Appl. No.: 13/221,171

(22) Filed: Aug. 30, 2011

(65) Prior Publication Data

US 2012/0054725 A1 Mar. 1, 2012

(30) Foreign Application Priority Data

Aug. 31, 2010 (JP) .................................. 2010-194224

(51) Int. Cl.  
*G06F 9/45* (2006.01)  
*G06F 9/455* (2006.01)

(52) U.S. Cl.  
CPC .......... *G06F 8/4443* (2013.01); *G06F 9/45516* (2013.01)

(58) Field of Classification Search  
None  
See application file for complete search history.

(56) References Cited

U.S. PATENT DOCUMENTS

| | | | | |
|---|---|---|---|---|
| 5,995,754 | A * | 11/1999 | Holzle et al. | 717/158 |
| 6,442,752 | B1 * | 8/2002 | Jennings et al. | 717/162 |
| 6,810,519 | B1 * | 10/2004 | Hicks | 717/166 |
| 6,957,423 | B1 * | 10/2005 | Ma | 717/137 |
| 7,171,650 | B2 * | 1/2007 | Fenton et al. | 717/120 |
| 7,461,205 | B2 * | 12/2008 | O'Brien et al. | 711/118 |
| 7,493,610 | B1 * | 2/2009 | Onodera et al. | 717/155 |
| 2011/0131561 | A1 * | 6/2011 | Adams et al. | 717/159 |
| 2012/0096447 | A1 * | 4/2012 | Inglis et al. | 717/148 |

FOREIGN PATENT DOCUMENTS

| | | |
|---|---|---|
| JP | 2000-207212 A | 7/2000 |
| JP | 2005-346407 A | 12/2005 |
| JP | 2007-109044 | 4/2007 |

OTHER PUBLICATIONS

Suganama, et al., "An Empirical Study of Method In-lining for a Java Just-in-Time Compiler," Proceedings of the 2nd JVM Symposium, p. 91-104, Aug. 2002.

Whaley, et al., "Dynamic Optimization through the use of Automatic Runtime Specialization," Thesis for Massachusetts Institute of Technology, pp. 1-114, May 1999.

Arnold, et al. "A Comparative Study of Static and Profile-Based Heuristics for Inlining", ACM SIGPLAN Notices archive, vol. 35, Issue 7, pp. 52-64, Jul. 2000.

* cited by examiner

*Primary Examiner* — Evral E Bodden  
(74) *Attorney, Agent, or Firm* — Fusheng Xu (57) ABSTRACT

A method and system for code generation and inlining. The method includes: scanning a code, where the code includes a method; determining whether the method includes a branch if the method is too large in size to be inlined, where the branch is based on runtime types of argument; profiling runtime types of actual arguments at a call site in the method if the method includes the branch; generating a polymorphic inline cache (PIC) code from a plurality of arguments, where the plurality of arguments are based on a result of the profiling step; generating a specialized method for a frequently appearing combination of the runtime types of argument and arguments that can be invoked from the PIC code; and inlining body of the specialized method into the call site if the specialized method has a body size within a permissible range.

14 Claims, 6 Drawing Sheets

METHOD AND SYSTEM FOR CODE GENERATION AND INLINING

CROSS-REFERENCE TO RELATED APPLICATION

This application claims priority under 35 U.S.C. §119 from Japanese Patent Application No. 2010-194224 filed Aug. 31, 2010, the entire contents of which are incorporated herein by reference.

BACKGROUND OF THE INVENTION

1. Field of the Invention

The Present Invention relates to optimization of an executable code in a programming language processor. More particularly, the Present Invention is related to an inlining technique.

2. Description of Related Art

Dynamic scripting languages such as PHP and more static programming languages such as Java(R) have conventionally been used for programming language processors or execution systems in the server environments. In recent years, in order to allow Java(R) class resources to be readily invoked from PHP and the like, a mechanism has been proposed, where the mechanism declares a class of static language platform from a program in a dynamic scripting language such as PHP to allow untyped accesses on a Java(R) virtual machine or a static language platform. (e.g., common language infrastructure (CLI)).

Particularly, known platforms that operate on Java(R) virtual machine include P8 and Quercus as PHP, JRuby as Ruby, Jython as Python, and Groovy.

Almost all the bytecodes generated by these scripting language processors form a subroutine threading style in order to process language constructs, which can contain complex semantics. A feature of a function or method which is invoked as a subroutine is sometimes referred to as a runtime helper function. Such a subroutine call can be optimized by inlining at least one function or method being invoked and combining the same with other inlined functions or methods.

The following is an example of such inlining. First, assume that the following bytecode has been generated:

```
Obj f(Obj a, Obj b, Obj c){
  load a
  load b
  invoke add(Obj,Obj)
  load c
  invoke sub(Obj,Obj) . . .
  invoke print(Obj) . . .
```

When the above code is expressed as pseudo-source code for ease of understanding (the same applies below), the following is derived.

```
Obj f(Obj a, Obj b, Obj c){
  print(sub(add(a,b), c)) . . .
```

Assume that the above code of add(Obj,Obj) which is invoked is as follows.

```
Obj add(Obj x, Obj y){
  if (x instanceof Int && y instanceof Int){
    return new Int(x.getInt( ) + y.getInt( ));
  } else if (x instanceof Dbl . . . ){
    . . .
  } else if ( . . . ){
    . . .
```

Also, assume that the above code of sub(Obj,Obj) being invoked is as follows.

```
Obj sub(Obj x, Obj y){
  if (x instanceof Int && y instanceof Int){
    return new Int(x.getInt( ) - y.getInt( ));
  }else if (x instanceof Dbl . . . ){
    . . .
  }else if ( . . . ){
    . . .
```

If add(Obj x, Obj y) and sub(Obj x, Obj y) are inlined into the original bytecode, evaluation of the common sub-expressions can be performed at once, and generation of intermediate data can be eliminated, leading to increased speed of code execution.

The code of such a subroutine, however, is too large in size to be inlined using a conventional scripting language compiler. Therefore, the size of the inlined code will become too large, and optimization can be hindered within a realistic time frame.

Japanese Unexamined Patent Publication No. 2007-109044 discloses a code conversion program that includes: a dedicated invoked program generation unit which detects an invoked program from a program group, an argument for differentiating processes of the invoked program, and the content of the argument, and generates a program for only executing a process that corresponds to the content of the argument within the processes of the invoked program; a call site detection unit which detects a call site that invokes the invoked program from the program group; and an invoking program rewriting unit which rewrites the call site to invoke the dedicated invoked program generated by the dedicated invoked program generation unit. This technique, however, does not suggest an application for code inlining. Furthermore, in cases where the contents of a plurality of arguments potentially vary, the number of dedicated invoked programs will become too many that corresponds with the number of combinations. It is impractical to do the same at runtime.

Suganama, et al., "An Empirical Study of Method In-lining for a Java Just-in-Time Compiler," Proceedings of the 2nd JVM Symposium, p. 91-104, August, 2002, discloses a technique that inlines a hot path in a large method body. Suganuma's technique, however, cannot be applied to cases where a runtime helper function is invoked from a large number of call sites in different contexts, because the hot path cannot be determined.

Whaley, "Dynamic Optimization through the use of Automatic Runtime Specialization", thesis for MASSACHUSETTS INSTITUTE OF TECHNOLOGY, Can 1999, particularly in Chapter 3.4.16, discusses about predicting the benefit obtained from a code which is specialized on the basis of the parameter type.

Arnold, et al. "A Comparative Study of Static and Profile-Based Heuristics for Inlining", ACM SIGPLAN Notices archive, Volume 35, Issue 7, pp. 52-64, July 2000, discusses profile-based heuristics for inlining.

SUMMARY OF THE INVENTION

It is an object of the present invention to provide a technique for enabling inlining of a large subroutine or method, which would be difficult to process with conventional techniques.

Accordingly, one aspect of the present invention provides a method of generating codes for inlining, the method including the steps of: scanning a code, where the code includes a method; determining whether the method includes a branch if the method is too large in size to be inlined, where the branch is based on runtime types of argument; profiling runtime types of actual arguments at a call site in the method if the method includes the branch; generating a polymorphic inline cache (PIC) code from a plurality of arguments, where the plurality of arguments are based on a result of the profiling step; generating a specialized method for a frequently appearing combination of the runtime types of argument and arguments that can be invoked from the PIC code; and inlining body of the specialized method into the call site if the specialized method has a body size within a permissible range, where at least one of the steps is carried out using a computer device.

Another aspect of the present invention provides a computer readable storage medium tangibly embodying a computer readable program code having computer readable instructions which when implemented, cause a computer to carry out the steps of a method including: scanning a code, where the code includes a method; determining whether the method includes a branch if the method is too large in size to be inlined, where the branch is based on runtime types of argument; profiling runtime types of actual arguments at a call site in the method if the method includes the branch; generating a polymorphic inline cache (PIC) code from a plurality of arguments, where the plurality of arguments are based on a result of the profiling step; generating a specialized method for a frequently appearing combination of the runtime types of argument and arguments that can be invoked from the PIC code; and inlining body of the specialized method into the call site if the specialized method has a body size within a permissible range.

Another aspect of the present invention provides a code generating system that inlines a method, the system including: a scanning module for scanning a code, where the code includes a method; a determining module for determining whether the method includes a branch if the method is too large in size to be inlined, where the branch is based on runtime types of argument; a profiling module for profiling runtime types of actual arguments at a call site in the method if the method includes the branch; a PIC module for generating a polymorphic inline cache (PIC) code from a plurality of arguments, where the plurality of arguments are based on a result of the profiling step; a specialized method module for generating a specialized method for a frequently appearing combination of the runtime types of argument and arguments that can be invoked from the PIC code; and an inlining module for inlining body of the specialized method into the call site if the specialized method has a body size within a permissible range.

DETAILED DESCRIPTION OF THE PREFERRED EMBODIMENTS

Hereinafter, embodiments of the present invention will be described with reference to the drawings. It should be understood that they illustrate preferable embodiments of the present invention, and do not restrict the scope of the invention thereto. Throughout the drawings, the same or like reference numerals denote the same or like objects, unless otherwise specified.

The above and other features of the present invention will become more distinct by a detailed description of embodiments shown in combination with attached drawings. Identical reference numbers represent the same or similar parts in the attached drawings of the invention.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer. Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams can represent a module, segment, or portion of code, which includes one or more executable instructions for implementing the specified logical function(s). It should also be noted that, in some alternative implementations, the functions noted in the block can occur out of the order noted in the figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "includes" and/or "including," when used in this specification, specify the presence of stated features, integers, steps, operations, elements, and/or components, but do not preclude the presence or addition of one or more other features, integers, steps, operations, elements, components, and/or groups thereof. The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The present invention relates to an inlining method in a dynamic compiler such as a Java(R) VM JIT compiler. In case where a method body is sufficiently small in size, the method is inlined as it is. When a path (hot path) is sufficiently small in size and is frequently executed in the method body, a part that is extracted only from the hot path is inlined. The part is extracted even when the method body is not sufficiently small.

In case where inlining is not possible in the above steps, a code converter according to the present invention checks whether the method is deemed multimethods. The term "deemed multimethods" is defined in the context of the present invention, the definition of which is provided as follows.

The deemed multimethods refer to a method, where a body of the method includes a code that meets one of the following conditions:

(a) the code branches based on the result of runtime type checking performed on the objects passed as method parameter arguments using instanceof or checkcast;

(b) the code branches based on the result of method invocation using invokevirtual or invokeinterface on the objects passed as method parameter arguments, the result being often the same for each type of the target objects; and (c) the code passes the objects of dummy arguments as actual arguments for other deemed multimethods.

According to an aspect of the present invention, if a method is determined to be deemed multimethods, probability distribution of runtime types, which are taken from the sets of actual arguments, is checked (by type inference or profiling).

If the distribution of the sets of actual argument types is biased, a method is specialized for the set of types that appears with high frequency, and the method and the set of types are cached as a key.

Additionally, the invoking code is optimized for some of such sets of types appearing with high frequency, in order to invoke the method specialized as a result of the runtime checking.

A specialized method is inlined provided that the specialized method is sufficiently small in size.

The present invention enables efficient inlining of a method invocation, such as an invocation of the runtime helper in the scripting language implementation, which would not have conventionally been inlined despite the possibility that the code could be specialized on the basis of the context of the invoking side so as to be ultimately inlined compactly.

Figure 1:
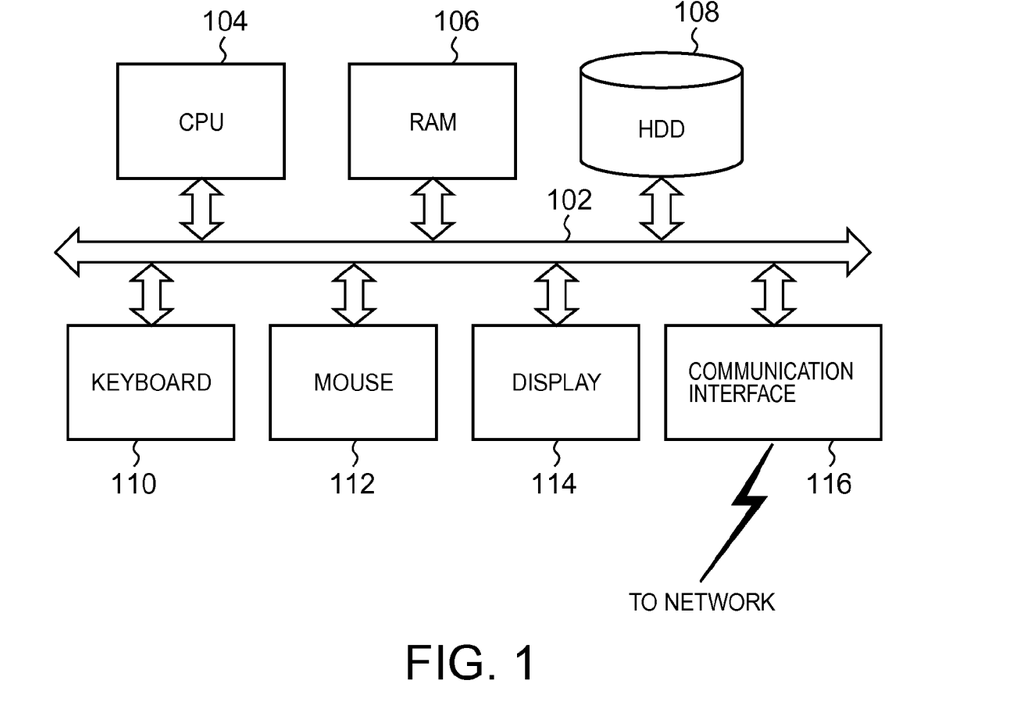
FIG. 1 shows an example of a block diagram of a hardware that implements an embodiment of the present invention.

In FIG. 1, which is a block diagram of the computer hardware for implementing the system configuration and processing according to an embodiment of the present invention, a CPU 104, a main storage (RAM) 106, a hard disk drive (HDD) 108, a keyboard 110, a mouse 112, and a display 114 are connected to a system bus 102. CPU 104 is suitably based on the 32-bit or 64-bit architecture, where Intel Pentium (trademark) 4, Intel Core (trademark) 2 DUO, ADM Athlon (trademark), or the like can be used. Main storage 106 suitably has a capacity of 1 GB or more, or more preferably a capacity of 2 GB or more.

Hard disk drive 108 stores an operating system. Operating system can be an arbitrary one adapted to CPU 104, and operating system can be Linux (trademark), Microsoft Windows (trademark) 7, Windows XP (trademark), Windows (trademark) 2003 server, Apple Computer Mac OS (trademark), or the like.

Hard disk drive 108 also stores Apache or another program for causing the system to operate as a Web server. The program is loaded to main storage 106 at startup of the system.

Hard disk drive 108 further stores therein a Java(R) Runtime Environment program for implementing the Java(R) virtual machine (VM). The program is loaded to main storage 106 at startup of the system.

Hard disk drive 108 further stores therein a Java(R) bytecode generator for a dynamic scripting language, and source code written in the dynamic scripting language. The dynamic scripting language in the present embodiment can be any of P8 and Quercus, JRuby as Ruby, Jython as Python, Groovy, and others, which are the dynamic scripting languages that operate on the Java(R) virtual machine. In the present embodiment, particularly, a Java(R) bytecode generator for PHP, typically P8, is used.

Keyboard 110 and mouse 112 are used to operate graphic objects such as icons, task bars, and windows displayed on the display 114, in accordance with a graphic user interface provided by operating system.

Display 114 is suitably a 32-bit true color LCD monitor with the resolution of 1024×768 or more, although not limited thereto.

Communication interface 116 is connected to a network suitably by the Ethernet(R) protocol. Communication interface 116, in accordance with the features provided by Apache, receives a processing request from a client computer (not shown), or returns a processing result thereto, under the TCP/IP or other communication protocol.

Figure 2:
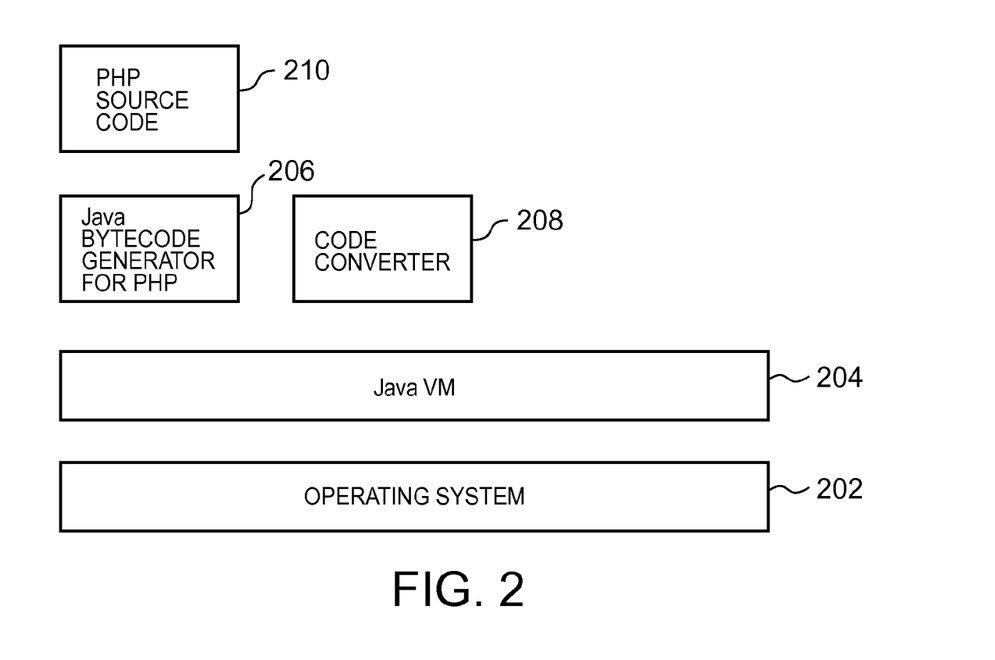
FIG. 2 shows layers of functional blocks.

In FIG. 2, the lowest layer corresponds to operating system 202. In the present embodiment, it is a Windows (trademark) 2003 server or Linux (trademark), although not limited thereto.

On operating system 202, Java(R) Virtual Machine (Java (R) VM) 204 operates with the version that matches operating system 202.

On Java(R) VM 204 layer, Java(R) bytecode generator 206 for PHP and a code converter 208 according to the present invention operate.

PHP source code 210, which is stored in hard disk drive 108, is a file including a statement described in <?php~?> and an extension php. In response to a request received from a client computer (not shown) via the network, Java(R) bytecode generator 206 for PHP interprets and executes designated PHP source code 210 to generate a bytecode.

Code converter 208 performs method inlining as appropriate, by the processing which will be described later, on the bytecode generated by Java(R) bytecode generator 206 for PHP, to thereby convert the same into a more optimized bytecode.

The features of code converter 208 are implemented suitably as part of the features of a JIT compiler (not shown). That is, the JIT compiler uses the features of code converter 208 to optimize, in terms of method inlining, the bytecode received from Java(R) bytecode generator 206 for PHP, and then converts the resultant bytecode into an executable code that is native to CPU 104 and to operating system 202.

Hereinafter, the inlining processing according to code converter 208 will be described with reference to the flowchart in FIG. 3. Code converter 208 scans a bytecode. After detecting a code for invoking a method, code converter 208 carries out the processing of the flowchart in FIG. 3.

In step 302, code converter 208 determines whether the size of the method is sufficiently small. If so, in step 304, code converter 208 inlines the method into the invoking code, before terminating the processing.

If it is determined in step 302 that the method size is not sufficiently small, in step 306, code converter 208 determines whether a hot path in the method is sufficiently small in size. If so, in step 304, code converter 208 inlines the hot path into the invoking code, and terminates the processing.

If it is determined in step 306 that the hot path size is not sufficiently small, in step 308, code converter 208 determines whether the method corresponds to the deemed multimethods. The term "deemed multimethods" is defined particularly in the present embodiment, which refers to a method the body of which includes a code well meeting one of the following conditions:

(a) the code branches on the basis of the result of runtime type checking performed on the objects of dummy arguments using instanceof or checkcast;

(b) the code branches on the basis of the result of method invocation using invokevirtual or invokeinterface on the objects of dummy arguments, the result being (often) the same for each type; and (c) the code passes the objects of dummy arguments as actual arguments for other deemed multimethods.

Figure 4:
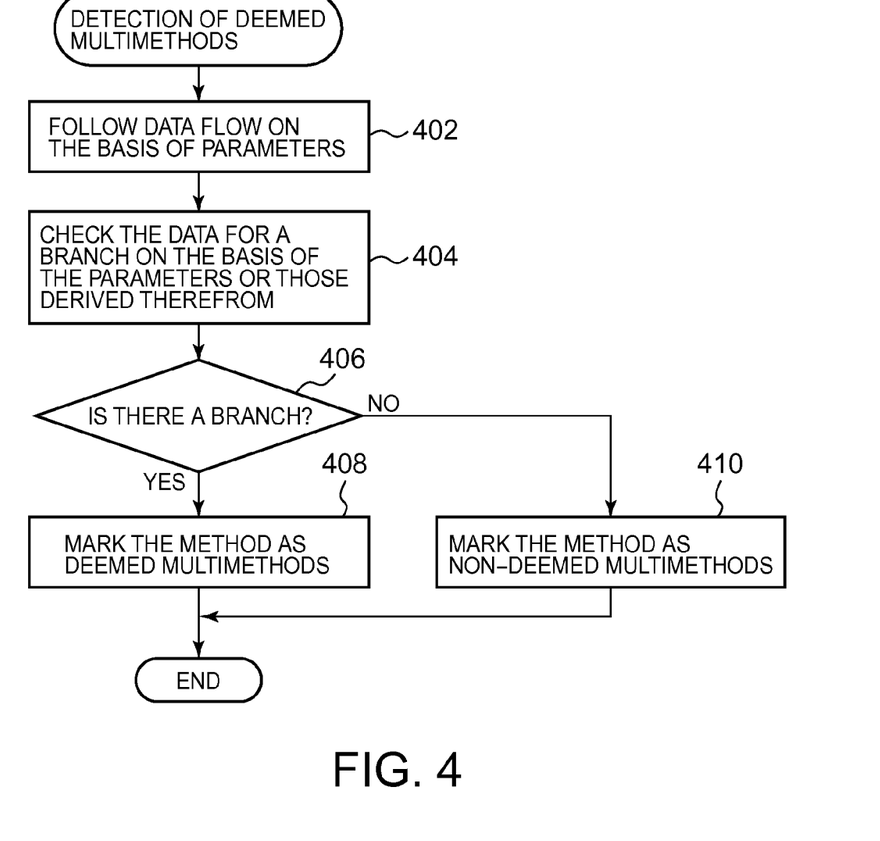
FIG. 4 is a flowchart illustrating deemed multimethods detecting processing.

The processing of determining the deemed multimethods will be described later with reference to the flowchart in FIG. 4.

If it is determined in step 308 that the method does not correspond to the deemed multimethods, code converter 208 terminates the processing, without inlining.

If it is determined in step 308 that the method corresponds to the deemed multimethods, code converter 208 advances the process to step 310.

In step 310, code converter 208 carries out profiling, or, checks the probability distribution of runtime types of the sets of actual arguments, this step is performed as an example in the following manner. A bytecode is converted into an executable code by the JIT compiler, without being subjected to the inlining processing by code converter 208, and the result of execution of the executable code is measured. The details of the profiling processing will be described later with reference to the flowcharts in FIGS. 5 and 6.

In the following step 312, code converter 208 specializes a method for the set of types appearing with high frequency that has been obtained as a result of the profiling, and caches the method and the set of types as a key.

In the following step 314, code converter 208 optimizes the invoking code to invoke the specialized method.

In the following step 316, code converter 208 determines whether the specialized method is sufficiently small in size. If so, in step 318, code converter 208 inlines the specialized method; otherwise, code converter 208 terminates the processing, without performing inlining.

Hereinafter, the processing for determining the deemed multimethods by code converter 208 will be described with reference to the flowchart in FIG. 4. In step 402, code converter 208 follows the data flow on the basis of parameters. Here, the parameters refer to the types such as int and double.

In step 404, code converter 208 checks the data for a branch on the basis of the parameters or those derived therefrom. Specifically, it is checked whether there is a branch based on the result of runtime type checking by instanceof or checkcast, or whether there is a branch based on the result of method invocation by invokevirtual or invokeinterface, the result being (often) the same for different types.

If code converter 208 determines in step 406 that there is such a branch, in step 408, code converter 208 marks the method as the deemed multimethods. If not, in step 410, code converter 208 marks the method as the non-deemed multimethods.

Figure 3:
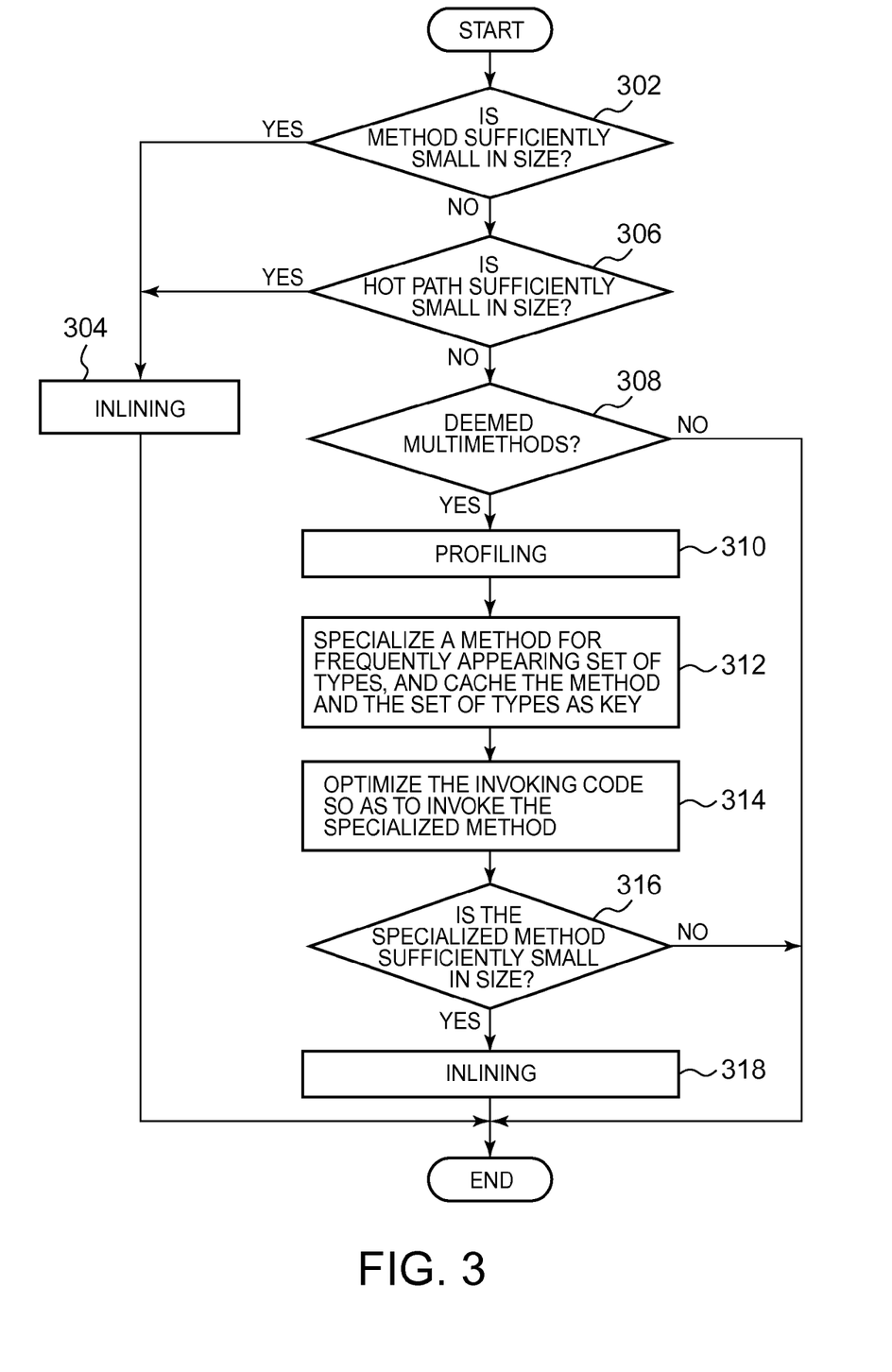
FIG. 3 is a flowchart schematically illustrating overall inlining processing.

The result marked here is used in step 308 in FIG. 3.

Hereinafter, the profiling processing in step 310 in FIG. 3 will be described with reference to the flowcharts in FIGS. 5 and 6. This processing is called "method prologue instrumentation".

Figure 5:
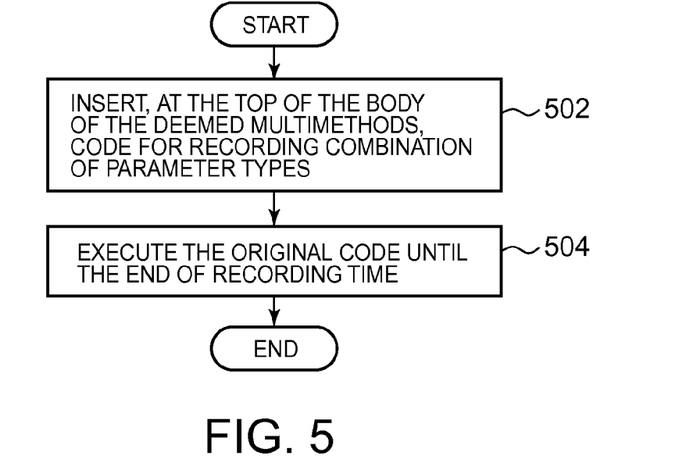
FIGS. 5 and 6 are flowcharts illustrating method prologue instrumentation processing.

The flowchart in FIG. 5 illustrates the processing on the invoked deemed multimethods side. In step 502, code converter 208 inserts, at the top of the body of the deemed multimethods, a code for recording a combination of parameter types. This can be for example a code for recording parameters of the deemed multimethods on main storage 106 under a prescribed array name.

Then, in step 504, code converter 208 executes the original code in the state where the above-described code has been inserted into the deemed multimethods. The code is suitably converted into a native code by the JIT compiler before being executed.

Figure 6:
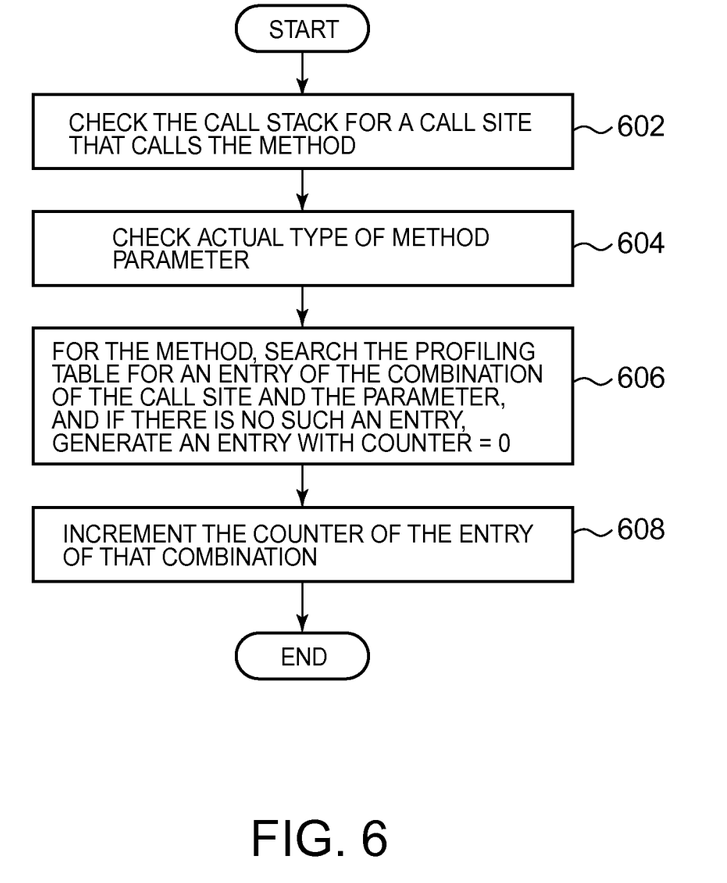

The flowchart in FIG. 6 illustrates the processing on the side invoking the deemed multimethods. In step 602, code converter 208 checks the call stack for a call site that calls the deemed multimethods.

In step 604, code converter 208 checks the actual type of the method parameter calling the deemed multimethods.

In step 606, regarding the deemed multimethods, code converter 208 searches a profiling table for an entry of the combination of the call site and the parameter. If there is no such an entry, code converter 208 generates an entry with its counter=0. Here, the call site actually is a call site ID of a prescribed numerical value generated. When a call site invokes a method, the call site ID is determined so as to be unique to the call site, suitably by code converter 208. An example of profiling table will be described later with reference to FIG. 7.

In step 608, code converter 208 increments the counter for the entry of that combination, in profiling table, before terminating the processing.

Figure 7:
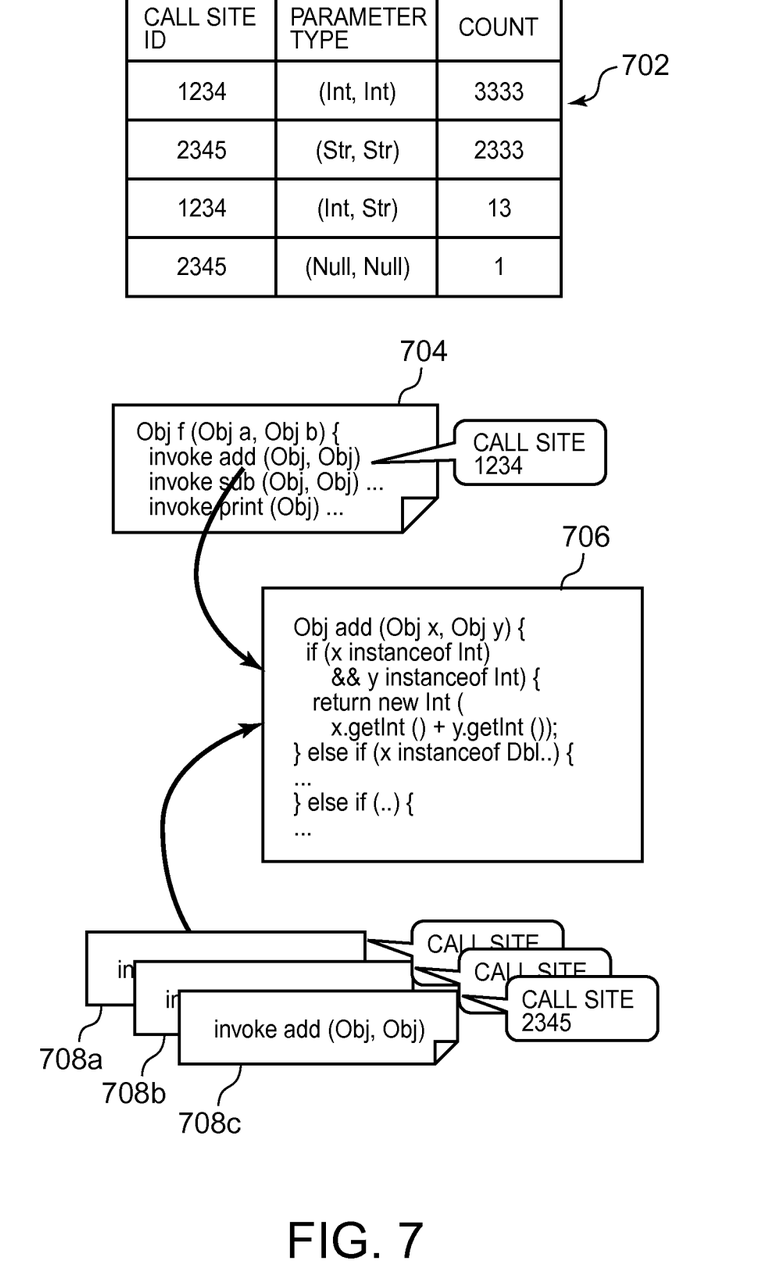
FIG. 7 shows an example of a profiling table.

FIG. 7 shows profiling table 702 which is generated suitably in main storage 106 by the profiling processing. In profiling table 702, the parameter type refers to information used for invoking a method, such as (Int,Int) or (Int,Str). The parameter type is recorded by the code inserted in step 502 in FIG. 5.

Profiling table 702 is provided for each invoked method, or is generated with the field for identifying a method added thereto. Profiling table 702 shown in FIG. 7 is the one related to a single method, for the sake of convenience.

The call site ID is a value which is given by code converter 208, which is unique to a location at the invoking side in the original bytecode. In the example shown in FIG. 7, the call site ID=1234 is given to a prescribed location in a bytecode 704.

In profiling table 702, the "count" field is incremented in step 608 in FIG. 6. That is, every time the method is invoked at the same call site and with the same parameter type combination, the count for the entry corresponding to that call site ID and that parameter type is incremented.

According to the present embodiment, as shown in step 314 in FIG. 3, for an invocation of a specialized method according to a result of the profiling, code converter 208 generates a code by optimizing the invoking code. The generated code is called a multi-parameter polymorphic inline cache (PIC) code. The multi-parameter PIC code will be described later.

Furthermore, according to an embodiment of the present invention, as shown in step 312 in FIG. 3, in response to an invocation from a multi-parameter PIC code, code converter 208 generates on demand. From invoked code 706, a code specialized for the parameter is invoked, where the specialized code is a part of the code in the deemed multimethods. Such specialized codes are shown as codes 708a, 708b, and 708c in FIG. 7.

An example of generation of a multi-parameter PIC code, corresponding to step 314 in FIG. 3, will be described in more detail. Specifically, in response to "invoke add(Obj,Obj)" as an invoking code, code converter 208 generates a PIC code as follows, which is specialized for (Int,Int).

```
dup2
instanceof Int
ifeq NOT_X_Int
instanceof Int
ifeq GENERAL_CALL
invoke add_Int_Int(Int,Int)
jmp END_PIC
NOT_X_Int:
pop
GENERAL_CALL:
invoke add(Obj,Obj)
END_PIC:
```

Alternatively, code converter 208 generates a PIC code as follows, which is specialized for (Int,Int) and (Int,Str).

```
dup2
instanceof Int
ifeq NOT_X_Int
instanceof Int
ifeq GENERAL_CALL
invoke add_Int_Int(Int,Int)
jmp END_PIC
NOT_X_Int:
dup_x1
instanceof Str
ifeq NOT_X_Str
instanceof Int
ifeq GENERAL_CALL
invoke add_Int_Str(Int,Str)
jmp END_PIC
NOT_X_Str:
pop
GENERAL_CALL:
invoke add(Obj,Obj)
END_PIC:
```

For which parameter(s) to specialize a code is determined on the basis of the result of the profiling at the call site.

An example of generation of a special code based on a parameter, corresponding to step 312 in FIG. 3, will now be described in more detail. Here, assume that the invoked code is listed as follows.

```
Obj add(Obj x, Obj y){
    if (x instanceof Int
        && y instanceof Int){
        return new Int(
            x.getInt( ) + y.getInt( ));
    } else if (x instanceof Dbl . . . ){
        . . .
    } else if ( . . . ){
        . . .
```

Then, a code specialized for (Int,Int) thereof is as follows.

```
Int add_Int_Int(Int x, Int y){
    return new Int(x.val + y.val); }
```

It will be apparent that this is the code obtained by extracting, from the above code of the deemed multimethods, only the portion satisfying the condition of (x instanceof Int && y instanceof Int).

Hereinafter, the overall flow of the above-described processing will be described as a summary with reference to FIG. 8.

Figure 8:
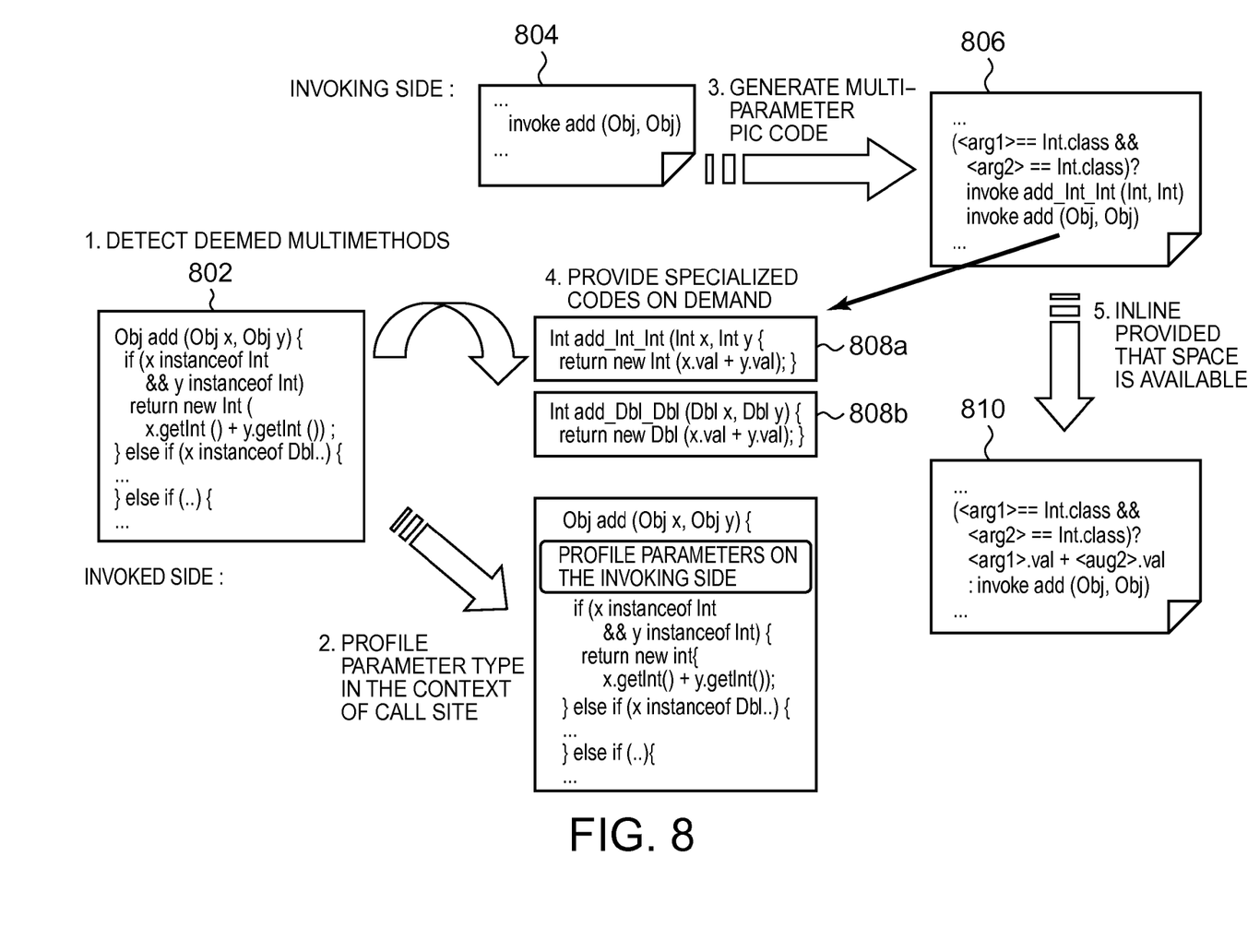
FIG. 8 schematically shows the overall inlining processing in the code level.

In FIG. 8, the first step is to detect a code of deemed multimethods. This corresponds to step 308 in FIG. 3. When code 802 of the deemed multimethods is recognized, the next step profiles the parameter type in the context of the call site. The profiling step corresponds to step 310 in FIG. 3.

The following step is to generate a multi-parameter PIC code 806 from an invoking code 804. Invoking code 804 is based on the result of profiling. The generating step corresponds to step 314 in FIG. 3.

On the invoked side, on the basis of the result of profiling, specialized codes 808a and 808b appearing with high frequency are cached. This corresponds to step 312 in FIG. 3.

When invoked from the multi-parameter PIC code 806, one of the specialized codes 808a and 808b corresponding to the parameter is inlined provided that there is a sufficient space for inlining the code, as shown by a code 810.

While the method prologue instrumentation has been used for profiling in the above-described embodiment of the present invention, call site instrumentation or any other instrumentation methods available can be used. The call site instrumentation is a technique of providing a call site with a code for checking and counting the parameter types.

Furthermore, while the case of compiling the bytecode for the Java(R) VM with the JIT compiler has been described in the above embodiment, the person skilled in the art will readily understand that the present invention is operable on any platform, OS, and language processor, as long as they allow the multi-parameter PIC code and the code specialized for a parameter in a method to be used for inlining.

What is claimed is:

1. A method of generating codes for inlining, the method comprising the steps of:
   scanning a code, wherein the code comprises a method;
   determining that the method is too large in size to be inlined;
   determining that the method comprises a branch that is based on a set of runtime types of arguments;
   profiling the set of runtime types of arguments at a call site in said the method to identify a set of profile parameters, the profiling including checking a probability distribution of the set of runtime types, wherein the probability distribution is used to determine a bias to a high frequency usage of the runtime types;
   generating a polymorphic inline cache (PIC) code from a plurality of runtime types of arguments, wherein the plurality of runtime types of arguments are based on the set of profile parameters;
   generating a specialized method for a frequently appearing combination of arguments in the plurality of runtime types of arguments, the frequently appearing combination of arguments being invokable from the PIC code, wherein the specialized method is specialized according to a corresponding pair of profile parameters within the set of profile parameters; and
   inlining a body of the specialized method into the call site, where the body has a size that is within a permissible size range,
   wherein
   at least one of the steps is carried out using a computer device.

2. The method according to claim 1, wherein said profiling step is carried out by type inference, wherein said type inference is based on a result from profiling method prologue instrumentation or call site instrumentation.

3. The method according to claim 1, further comprises the step of:
   implementing a JIT compiler, wherein said JIT compiler is configured to convert a Java(R) VM bytecode.

4. The method according to claim 3, wherein said Java(R) VM bytecode is generated by a dynamic scripting language processor comprising a feature of generating said Java(R) VM bytecode.

5. A computer readable storage medium tangibly embodying a computer readable program code having non-transitory computer readable instructions which cause a computer to carry out the steps of a method comprising:
   scanning a code, wherein the code comprises a method;
   determining that the method is too large in size to be inlined;
   determining that the method comprises a branch that is based on a set of runtime types of arguments;
   profiling the set of runtime types of arguments at a call site in the method to identify a set of profile parameters, the profiling including checking a probability distribution of the set of runtime types, wherein the probability distribution is used to determine a bias to a high frequency usage of the runtime types;
   generating a polymorphic inline cache (PIC) code from a plurality of runtime types of arguments, wherein the plurality of runtime types of arguments are based on the set of profile parameters;
   generating a specialized method for a frequently appearing combination of arguments in the plurality of runtime types of arguments, the frequently appearing combination of arguments being invokable from the PIC code, wherein the specialized method is specialized according to a corresponding pair of profile parameters within the set of profile parameters; and
   inlining a body of the specialized method into the call site, where the body has a size that is within a permissible size range.

6. The computer readable storage medium according to claim 5, wherein said profiling step is carried out by type inference, wherein said type inference is based on a result from profiling a method prologue instrumentation or a call site instrumentation.

7. The computer readable storage medium according to claim 5, further comprises the step of:
   implementing a JIT compiler, wherein said JIT compiler is configured to convert a Java(R) VM bytecode.

8. The computer readable storage medium according to claim 7, wherein said Java(R) VM bytecode is generated by a dynamic scripting language processor comprising a feature of generating said Java(R) VM bytecode.

9. The computer readable storage medium according to claim 8, wherein said dynamic scripting language processor comprises a program selected from the group consisting of P8, Quercus, JRuby, Jython, and Groovy.

10. A computer system for generating code that inlines a method, the computer system comprising:
- a processor(s) set; and
- a computer readable storage medium;

wherein:
- the processor set is structured, located, connected and/or programmed to run program instructions stored on the computer readable storage medium; and
- the program instructions include:
- first program instructions programmed to scan a code, wherein said code comprises a method;
- second program instructions programmed to determine that the method comprises a branch that is based on a set of runtime types of arguments;
- third program instructions programmed to profile the set of runtime types of arguments at a call site in the method if to identify a set of profile parameters, the profiling including checking a probability distribution of the set of runtime types, wherein the probability distribution is used to determine a bias to a high frequency usage of the runtime types;
- fourth program instructions programmed to generate a polymorphic inline cache (PIC) code from a plurality of runtime types of arguments, wherein the plurality of runtime types of arguments are based on the set of profile parameters:
- fifth program instructions programmed to generate a specialized method for a frequently appearing combination of arguments in the plurality of runtime types of arguments, the frequently appearing combination of arguments being invokable from the PIC code, wherein the specialized method is specialized according to a corresponding pair of profile parameters within the set of profile parameters: and
- sixth program instructions programmed to inline a body of the specialized method into the call site, where the body has a size that is within a permissible size range.

11. The computer system of claim 10, wherein the third program instructions programmed to profile the set of runtime types of arguments at a call site in the method is carried out by type inference, wherein said type inference is based on a result from profiling a method prologue instrumentation or a call site instrumentation.

12. The system according to claim 10, wherein said code is a Java(R) VM bytecode.

13. The system according to claim 12, further comprising:
- JIT compiler module for implementing a JIT compiler, wherein said JIT compiler is configured to convert a Java(R) VM bytecode.

14. The system according to claim 12, wherein said Java(R) VM bytecode is generated by a dynamic scripting language processor comprising a feature of generating said Java(R) VM bytecode.

* * * * *